(12) United States Patent
Nakagawa

(10) Patent No.: US 9,071,836 B2
(45) Date of Patent: Jun. 30, 2015

(54) IMAGE PROCESSING APPARATUS AND IMAGE PROCESSING METHOD

(75) Inventor: Akira Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 969 days.

(21) Appl. No.: 13/048,311

(22) Filed: Mar. 15, 2011

(65) Prior Publication Data

US 2011/0228849 A1 Sep. 22, 2011

(30) Foreign Application Priority Data

Mar. 17, 2010 (JP) .................................. 2010-61667

(51) Int. Cl.
*H04N 19/00* (2014.01)
*H04N 19/105* (2014.01)
*H04N 19/176* (2014.01)
*H04N 19/593* (2014.01)
*H04N 19/11* (2014.01)
*H04N 19/126* (2014.01)

(52) U.S. Cl.
CPC ........... *H04N 19/105* (2014.11); *H04N 19/176* (2014.11); *H04N 19/593* (2014.11); *H04N 19/11* (2014.11); *H04N 19/126* (2014.11)

(58) Field of Classification Search
CPC .................... H04N 19/0006; H04N 19/00121; H04N 19/00303
USPC ..................................................... 375/240.12
See application file for complete search history.

(56) References Cited

U.S. PATENT DOCUMENTS 5,838,378 A * 11/1998 Nakagawa et al. ...... 375/240.12
2005/0135700 A1 * 6/2005 Anderson ..................... 382/261

FOREIGN PATENT DOCUMENTS

| JP | 09-200766 | 7/1997 |
| JP | 2008-227670 | 9/2008 |
| JP | 2009-21786 | 1/2009 |

* cited by examiner

*Primary Examiner* — Sath V Perungavoor
*Assistant Examiner* — Jeffery Williams
(74) *Attorney, Agent, or Firm* — Staas & Halsey LLP

(57) ABSTRACT

An image processing apparatus includes a predictive picture generator configured to generate a predictive picture for an encoding target block based on pixel values of pixels included in already-encoded blocks around the encoding target block, a predictive error generator configured to generate predictive error based on a picture expressed by the encoding target block and a weighting unit configured to apply weights to pixel values by conducting a multiplication that multiplies by a constant greater than 1 the pixel values of pixels used to generate a predictive picture for another encoding target block, the pixels being pixels from among a plurality of pixels included in predictive error generated by the predictive error generator.

18 Claims, 11 Drawing Sheets

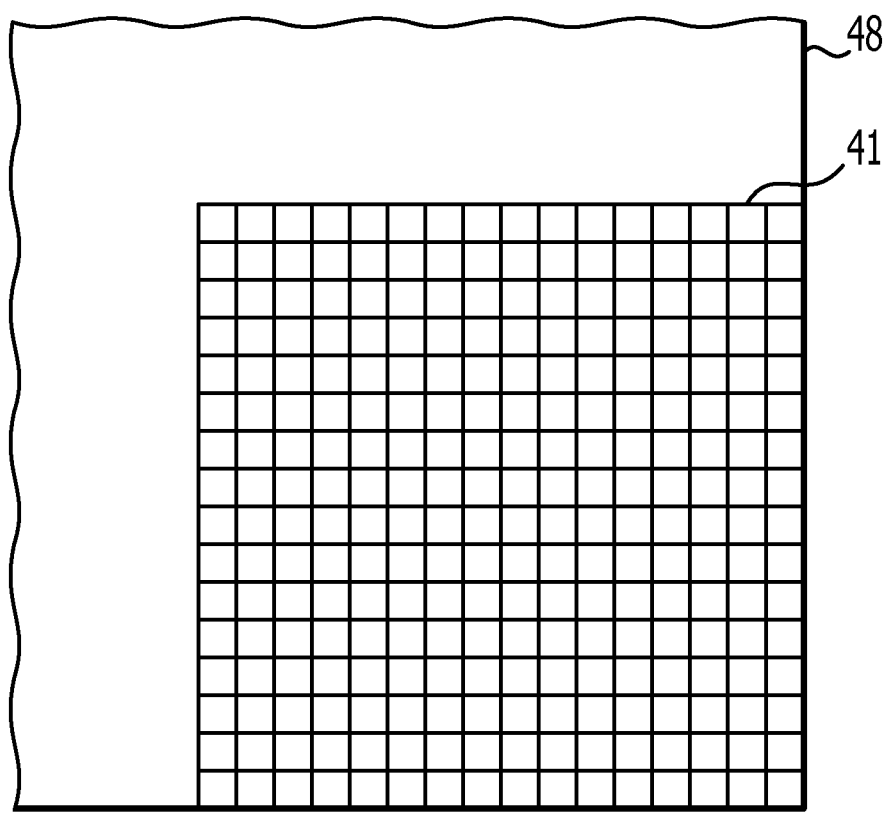

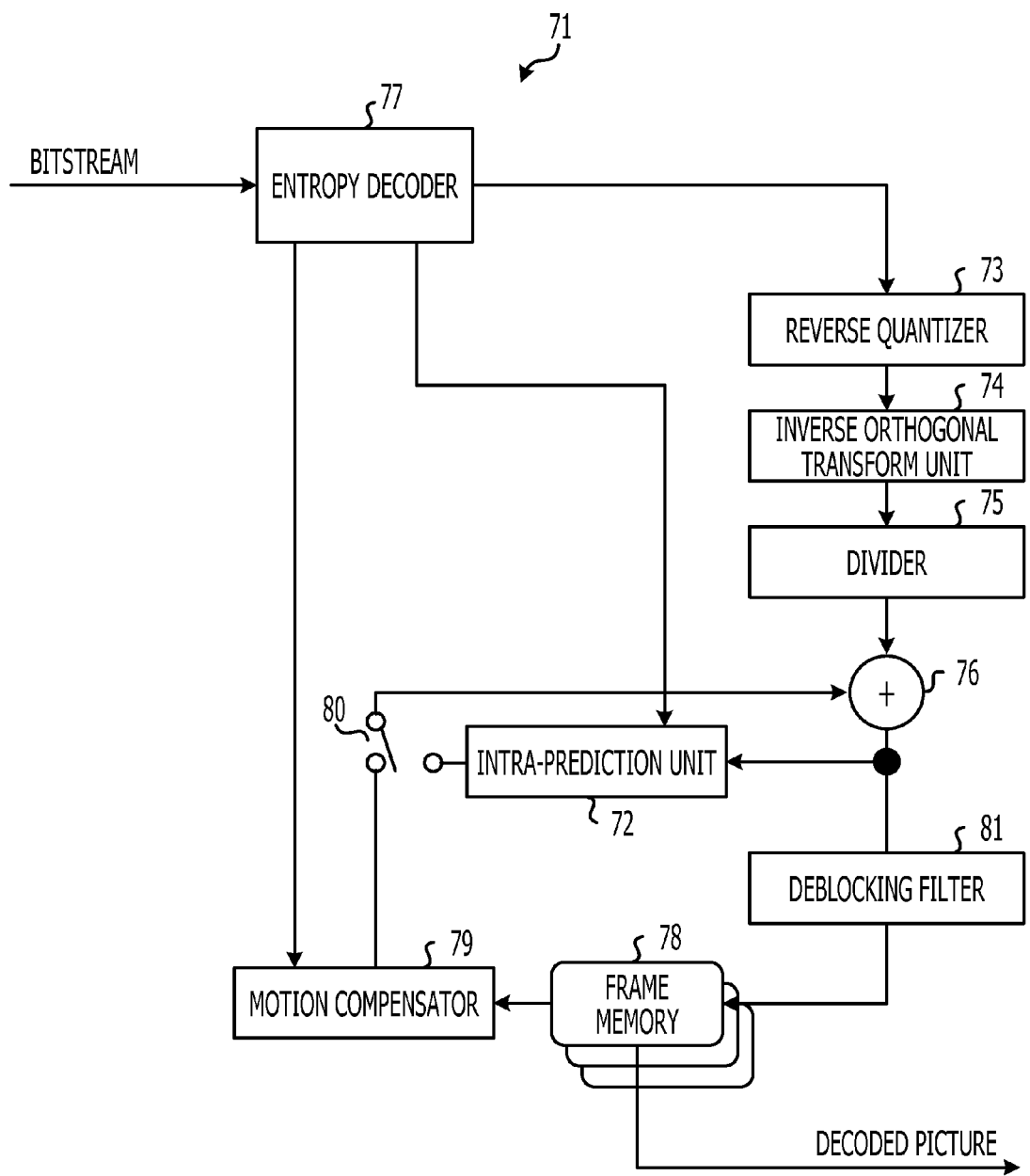

IMAGE PROCESSING APPARATUS AND IMAGE PROCESSING METHOD

CROSS-REFERENCE TO RELATED APPLICATIONS

This application is based upon and claims the benefit of priority of the prior Japanese Patent Application No. 2010-61667, filed on Mar. 17, 2010, the entire contents of which are incorporated herein by reference.

BACKGROUND

1. Field

Embodiments discussed herein relate to an image processing apparatus and an image processing method.

2. Description of the Related Art

In the related art, MPEG-4 (Moving Picture Experts Group phase 4) AVC (Advanced Video Coding)/H.264 exists as an international standard for video coding. In MPEG-4 AVC/H.264, an encoder computes predictive error between an input picture and a predictive picture, conducts orthogonal transformation, quantization, reverse quantization, and inverse orthogonal transformation, and reconstructs the predictive error. The encoder generates a decoded picture based on the reconstructed predictive error and a predictive picture within the frame (i.e., an intra-predictive picture) or a picture predicted among frames (i.e., an inter-predictive picture). The encoder generates inter-predictive pictures based on a decoded picture and an input picture. The encoder outputs a bit stream encoding quantization coefficients. The decoder decodes the bit stream, and reconstructs the predictive error by conducting reverse quantization and inverse orthogonal transformation. The decoder generates a decoded picture based on the predictive picture obtained by the reconstructed predictive error and the decoding of the bit stream.

Meanwhile, intra encoding process using intra-prediction is performed in macroblock units having 16 pixels horizontally by 16 pixels vertically, or in block units obtained by sub-dividing each macroblock into blocks having 4 pixels horizontally by 4 pixels vertically or 8 pixels horizontally by 8 pixels vertically. For chroma, an encoding process using intra-prediction is performed in block units obtained by sub-dividing each macroblock into blocks having 8 pixels horizontally by 8 pixels vertically. When the encoding process proceeds from the upper left to the lower right of a single source frame, the blocks (or macroblocks) above, diagonally left and above, diagonally right and above, and immediately left of the block or macroblock to be encoded (hereinafter collectively referred to as the encoding target block) have already been encoded.

Predictive pictures for the luma of 4×4 blocks or 8×8 blocks (pixels horizontally by pixels vertically) are generated based on the pixels lining the bottom edges of the blocks above and diagonally right and above the encoding target block, the pixel at the lower-right corner of the block diagonally left and above the encoding target block, and the pixels lining the right edge of the block immediately left of the encoding target block. In addition, predictive pictures for chroma blocks are generated based on the pixels lining the bottom edge of the macroblock or block immediately above the encoding target block, the pixel at the lower-right corner of the macroblock or block diagonally left and above the encoding target block, and the pixels lining the right edge of the macroblock or block immediately left of the encoding target block.

Technology like the above is disclosed in Japanese Laid-open Patent Publication No. 2009-21786 and Japanese Laid-open Patent Publication No. 2008-227670.

SUMMARY

An image processing apparatus includes a predictive picture generator configured to generate a predictive picture for an encoding target block based on pixel values of pixels included in already-encoded blocks around the encoding target block, a predictive error generator configured to generate predictive error based on a picture expressed by the encoding target block and a weighting unit configured to apply weights to pixel values by conducting a multiplication that multiplies by a constant greater than 1 the pixel values of pixels used to generate a predictive picture for another encoding target block, the pixels being pixels from among a plurality of pixels included in predictive error generated by the predictive error generator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 10 is a diagram explaining the relationship between encoding target blocks and screen display positions; and FIG. 11 is a block diagram illustrating an image processing apparatus in accordance with a fourth embodiment.

DETAILED DESCRIPTION OF THE PREFERRED EMBODIMENTS

Figure 1:
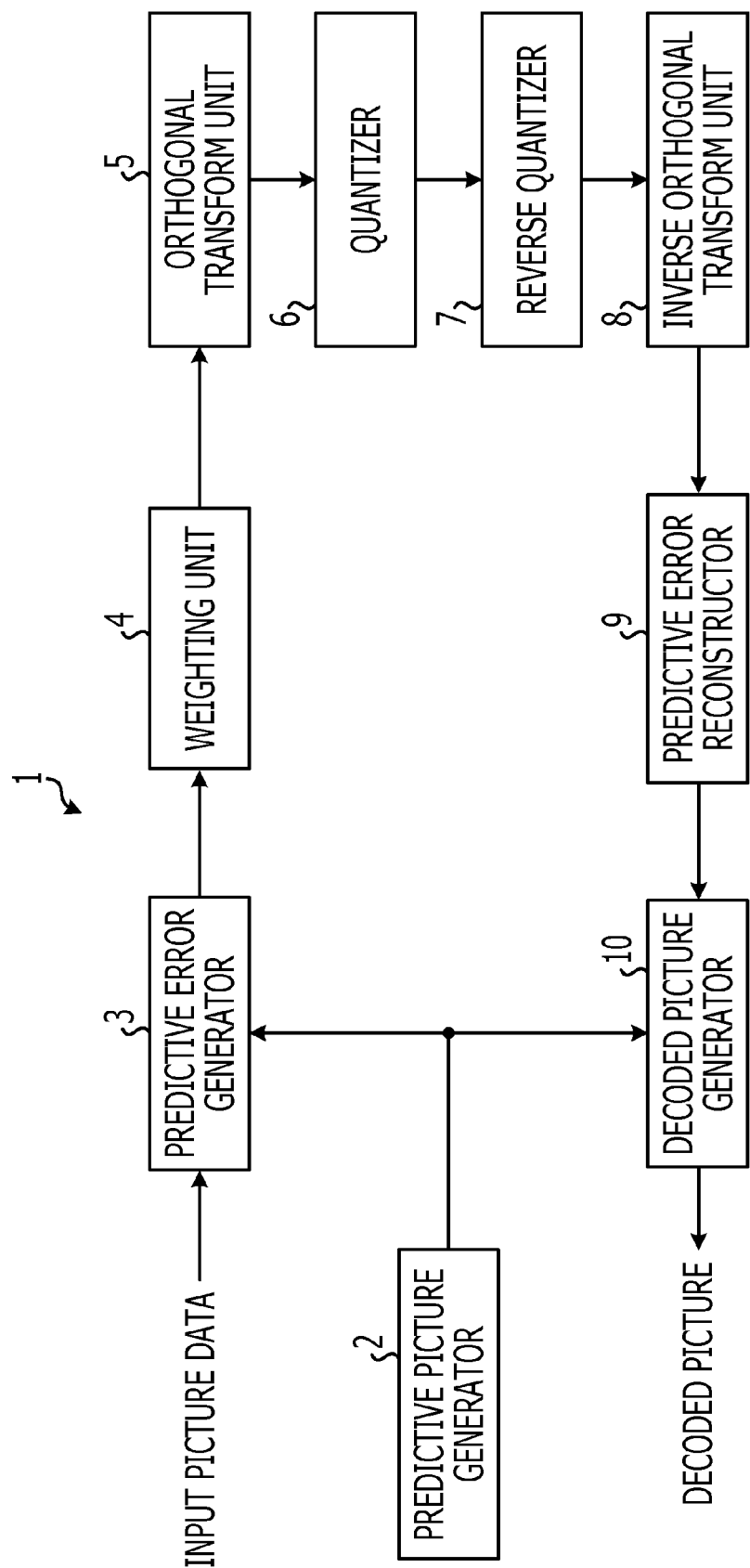
FIG. 1 is a block diagram illustrating an image processing apparatus in accordance with a first embodiment.

Reference may now be made in detail to embodiments of the present invention, examples of which are illustrated in the accompanying drawings, wherein like reference numerals refer to like elements throughout.

Hereinafter, preferred embodiments of an image processing apparatus and an image processing method will be described in detail and with reference to the attached drawings.

First, problems in the related art will be described.

In an encoding process using intra-prediction of the related art, a predictive picture of an encoding target block is generated by using already-encoded pixels positioned around the encoding target block as described above. For this reason, there is a problem in that if the encoding error of the pixels used to generate the predictive picture is large, then the quality (or in other words, the accuracy) of the predictive picture thus obtained will worsen, thereby worsening the encoding efficiency.

Embodiments discussed herein resolve the various foregoing problems.

An image processing apparatus and image processing method in accordance with an embodiment discussed herein conducts an orthogonal transformation wherein weights are applied to pixel values of pixels used to generate a predictive picture. After inverse orthogonal transformation, inverse weights are applied to the pixel values of the weighted pixels. In so doing, the encoding error of pixels used to generate a predictive picture is reduced.

First Embodiment

Description of Image Processing Apparatus

FIG. 1 is a block diagram illustrating an image processing apparatus in accordance with a first embodiment. The image processing apparatus in accordance with the first embodiment is an encoder that encodes input picture data. The encoder divides a single frame picture into a plurality of blocks, and encodes picture data on a per-block basis. As illustrated in FIG. 1, the encoder (image processing apparatus) 1 is provided with a predictive picture generator 2, a predictive error generator 3, a weighting unit 4, an orthogonal transform unit 5, a quantizer 6, a reverse quantizer 7, an inverse orthogonal transform unit 8, a predictive error reconstructor 9, and a decoded picture generator 10.

The predictive picture generator 2 generates a predictive picture for an encoding target block. At this point, the predictive picture generator 2 generates a predictive picture based on pixel values of pixels included in already-encoded blocks around an encoding target block. The predictive error generator 3 generates predictive error for each encoding target block in input picture data. The predictive error generator 3 may also generate predictive error by computing the difference between the picture expressed by an encoding target block and a predictive picture for the encoding target block generated by the predictive picture generator 2.

The weighting unit 4 applies weights to pixel values of pixels included in predictive error generated by the predictive error generator 3. For example, the weighting unit 4 may multiply by a first constant the pixel values of pixels used to generate a predictive picture for another encoding target block from among the plurality of pixels included in predictive error (first multiplication). In this case, the first constant may be greater than 1. Alternatively, the weighting unit 4 may multiply by a second constant the pixel values of pixels not used to generate a predictive picture for another encoding target block from among the plurality of pixels included in predictive error (second multiplication). In this case, the second constant may be less than 1. The weighting unit 4 may also conduct both a first multiplication and a second multiplication.

The orthogonal transform unit 5 generates transform coefficients by applying an orthogonal transform to the predictive error after weighting by the weighting unit 4. The quantizer 6 generates quantization coefficients by quantizing the transform coefficients generated by the orthogonal transform unit 5. The reverse quantizer 7 generates reverse quantization coefficients by reverse quantizing the quantization coefficients generated by the quantizer 6. The inverse orthogonal transform unit 8 generates inverse orthogonal transform data by applying an inverse orthogonal transform to the reverse quantization coefficients generated by the reverse quantizer 7.

The predictive error reconstructor 9 reconstructs predictive error based on inverse orthogonal transform data generated by the inverse orthogonal transform unit 8. At this point, when a first multiplication described above is conducted in the weighting unit 4, the predictive error reconstructor 9 may divide by a third constant the pixel values of pixels used to generate a predictive picture for another encoding target block from among the plurality of pixels included in the inverse orthogonal transform data (first division). The third constant may be greater than 1, for example. The third constant and the first constant may have the same value. When a second multiplication described above is conducted in the weighting unit 4, the predictive error reconstructor 9 may divide by a fourth constant the pixel values of pixels not used to generate a predictive picture for another encoding target block from among the plurality of pixels included in the inverse orthogonal transform data (second division). The fourth constant may be less than 1, for example. The fourth constant and the second constant may have the same value. When both a first multiplication and a second multiplication described above are conducted in the weighting unit 4, both a first division and a second division may be conducted in the predictive error reconstructor 9.

The decoded picture generator 10 generates a decoded picture. At this point, the decoded picture generator 10 may generate a decoded picture by adding predictive error generated by the predictive error reconstructor 9 to a predictive picture generated by the predictive picture generator 2. For example, the encoder 1 may generate and output a bit stream by entropy encoding, for example, quantization coefficients generated by the quantizer 6.

Description of Image Processing Method

Figure 2:
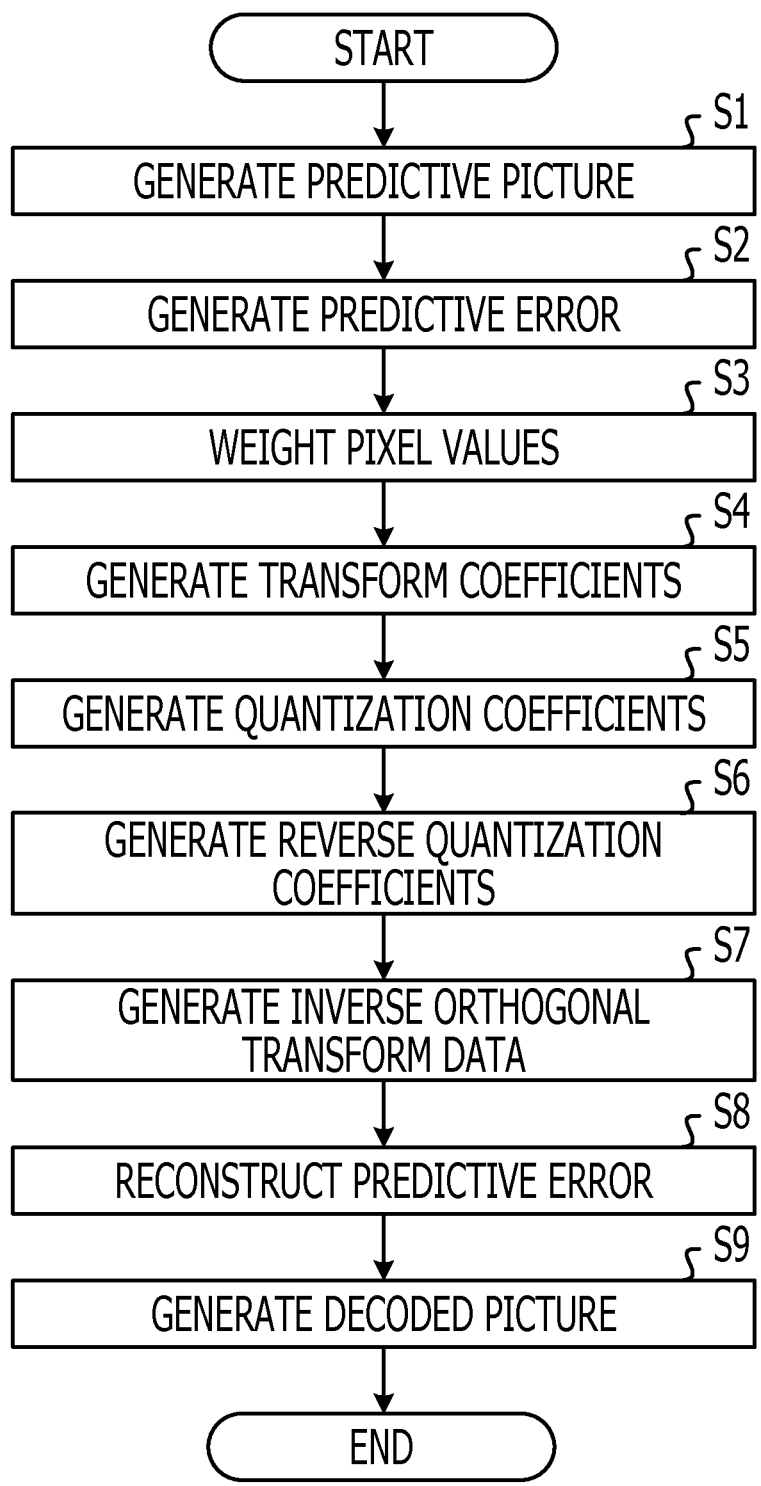
FIG. 2 is a flowchart illustrating an image processing method in accordance with a first embodiment.

FIG. 2 is a flowchart illustrating an image processing method in accordance with a first embodiment. The image processing method in accordance with the first embodiment is an encoding method for encoding input picture data. The encoding method divides a single frame picture into a plurality of blocks, and encodes picture data on a per-block basis. As illustrated in FIG. 2, when an input picture data encoding process (image processing) is started, first an encoder 1 generates a predictive picture for an encoding target block using a predictive picture generator 2 (operation S1). Next, the encoder 1 generates predictive error for the encoding target block using a predictive error generator 3 (operation S2).

Next, the encoder 1 applies weights to pixel values of pixels used to generate a predictive picture for another encoding target block from among the plurality of pixels included in the predictive error using a weighting unit 4 (operation S3). Next, the encoder 1 generates transform coefficients by applying an orthogonal transform to the weighted predictive error using an orthogonal transform unit 5 (operation S4). Next, the encoder 1 generates quantization coefficients by quantizing the transform coefficients using a quantizer 6 (operation S5). During quantization, error might be mixed into some of the quantization coefficients. The mixing of error into quantization coefficients will be described later.

Next, the encoder 1 generates reverse quantization coefficients by reverse quantizing the quantization coefficients using a reverse quantizer 7 (operation S6). Next, the encoder 1 generates inverse orthogonal transform data by applying an inverse orthogonal transform to the reverse quantization coefficients using an inverse orthogonal transform unit 8 (operation S7). In the inverse orthogonal transform data, error mixed into the quantization coefficients propagates uniformly. In other words, error that was localized in quantization coefficients is homogenized by an inverse orthogonal transform. The uniform propagation of error mixed into quantization coefficients will be described later.

Next, the encoder 1 generates predictive error by applying the reverse of the weighting process in operation S3 to the inverse orthogonal transform data using a predictive error reconstructor 9 (operation S8). Error is reduced for pixels used to generate a predictive picture for another encoding target block from among the plurality of pixels included in the reconstructed predictive error. Reducing error included in pixel values of pixels used to generate a predictive picture by conducting a weighting process before an orthogonal transform and applying the reverse of the weighting process after an inverse orthogonal transform is described in paragraphs 0083 to 0087 and FIG. 7 of Japanese Laid-open Patent Application Publication No. 9-200766.

However, in Japanese Laid-open Patent Application Publication No. 9-200766, the weighting process is amplitude modulation, and the reverse of the weighting process is amplitude demodulation. Also, the orthogonal transform is declared to be a discrete cosine transform, and the inverse orthogonal transform is declared to be an inverse discrete cosine transform. According to FIG. 7 of Japanese Laid-open Patent Application Publication No. 9-200766, a scale factor greater than 1 is set as the amplitude modulation factor before an orthogonal transform for flat parts of a predictive error signal (FIG. 7(b)), and a scale factor less than 1 is set as the amplitude demodulation factor after an inverse orthogonal transform (FIG. 7(f)). The above association demonstrates that error and encoding noise may be reduced in flat parts of an amplitude demodulated predictive error signal (FIGS. 7(g) and 7(h)). It should be appreciated that setting a scale factor greater than 1 has the same meaning as multiplying by a coefficient greater than 1, and setting a scale factor less than 1 has the same meaning as dividing by a coefficient greater than 1.

Next, the encoder 1 generates a decoded picture based on the reconstructed predictive error and the predictive picture for the encoding target block using a decoded picture generator 10 (operation S9). The series of encoding operations for a single encoding target block is then terminated. This series of encoding operations is conducted on all encoding target blocks.

Figure 3:
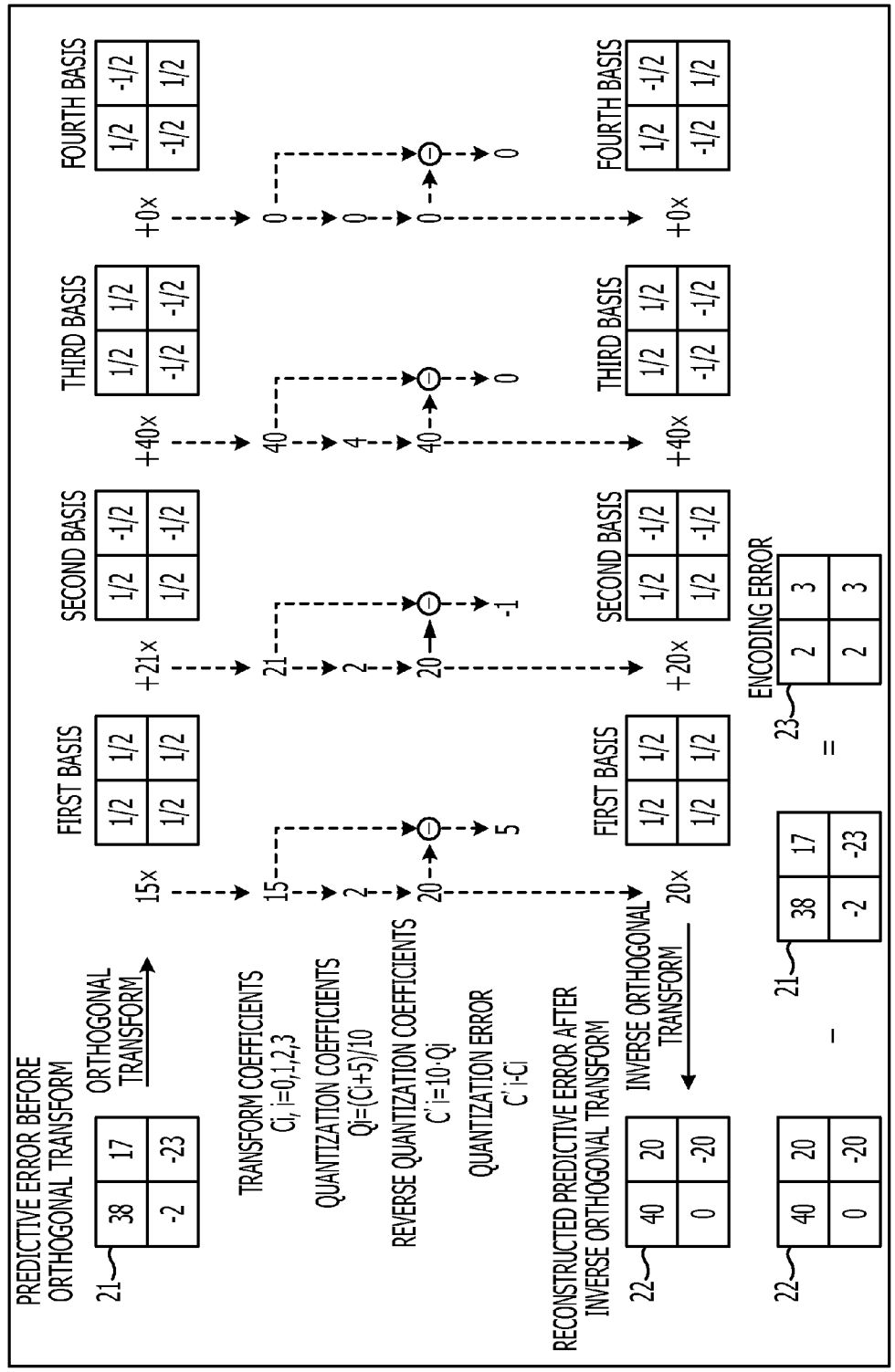
FIG. 3 is a diagram explaining mixing of error into quantization coefficients and homogenization of mixed error.

Explanation Regarding Mixing of Error into Quantization Coefficients and Homogenization of Mixed Error FIG. 3 is a diagram explaining mixing of error into quantization coefficients and homogenization of mixed error. As illustrated in FIG. 3, for the sake of simplicity herein, a predictive error signal block having 2 pixels horizontally by 2 pixels vertically is described by way of example. As an example, a pre-orthogonal transform predictive error signal block 21 is taken to have upper-left, upper-right, lower-left, and lower-right pixel values of 38, 17, −2, and −23, respectively. The pre-orthogonal transform predictive error signal block 21 is orthogonally transformed using first through fourth orthogonal bases (FIG. 3, top). The orthogonal bases in the example illustrated in FIG. 3 are known as the 2×2 Hadamard transform bases. In the example illustrated in FIG. 3, the pre-orthogonal transform predictive error signal block 21 is expressed as a linear combination of 15 times the first basis, 21 times the second basis, 40 times the third basis, and 0 times the fourth basis. The coefficients by which each orthogonal basis is multiplied are transform coefficients. In the example illustrated in FIG. 3, the respective transform coefficients are, in order from the first basis, 15, 21, 40, and 0.

Each transform coefficient is linearly quantized by 10, for example. Taking the transform coefficients to be $C_i$ (where i=0, 1, 2, 3) and the quantization coefficients to be $Q_i$, $Q_i$ may be expressed by the following formula. In the following formula, since 5 is added to $C_i$, the a quantization coefficients $Q_i$ are the transform coefficients $C_i$ divided by 10 and rounded to the nearest decimal point. In the example illustrated in FIG. 3, the respective quantization coefficients are, in order from the first basis, 2, 2, 4, and 0.

$$Q_i = (C_i + 5)/10$$

Each quantization coefficient $Q_i$ is reverse quantized by a quantizer 10, for example. In the example illustrated in FIG. 3, since each quantization coefficient $C_i$ is multiplied by 10, the respective reverse quantization coefficients $C'_i$ are, in order from the first basis, 20, 20, 40, and 0. Consequently, the quantization error due to quantizing and reverse quantizing is, in order from the first basis, 5, −1, 0, and 0. In this example, quantization error exists in the coefficient of the first basis and the coefficient of the second basis, while quantization error does not exist in the coefficient of the third basis and the coefficient of the fourth basis. With the inverse orthogonal transform, the respective reverse quantization coefficients 20, 20, 40, and 0 in order from the first basis are multiplied by the corresponding first basis, second basis, third basis, and fourth basis, and the multiplied results for each basis are summed. In the example illustrated in FIG. 3, a post-inverse orthogonal transform reconstructed predictive error signal block 22 has upper-left, upper-right, lower-left, and lower-right pixel values of 40, 20, 0, and −20, respectively (FIG. 3, middle).

Encoding error is obtained by subtracting respective pixel values in the pre-orthogonal transform predictive error signal block 21 from respective pixel values in the post-inverse orthogonal transform reconstructed predictive error signal block 22. Consequently, in the example illustrated in FIG. 3, an encoding error signal block 23 has upper-left, upper-right, lower-left, and lower-right pixel values of 2, 3, 2, and 3, respectively (FIG. 3, bottom). In other words, the quantization error that existed in the coefficient of the first basis and the coefficient of the second basis has nearly equally propagated to all pixels in the encoding error signal block 23. The explanation herein is merely one example, but the uniform propagation of quantization error to all pixels in a block is statistically known, even when given different respective pixel values, a different number of pixels in the predictive error signal block, or different numerical values for the respective orthogonal bases.

According to a first embodiment, encoding error in pixels used to generate a predictive picture is reduced by conducting a weighting process before an orthogonal transform, and conducting the reverse of the weighting process after an inverse orthogonal transform. Consequently, predictive picture quality is improved and encoding efficiency is improved, thereby enabling intra-prediction with better accuracy and efficiency.

Second Embodiment

An image processing apparatus in accordance with a second embodiment is a decoder that generates a decoded picture by decoding encoded data that has been encoded by an encoder in accordance with the first embodiment.

Description of Image Processing Apparatus

Figure 4:
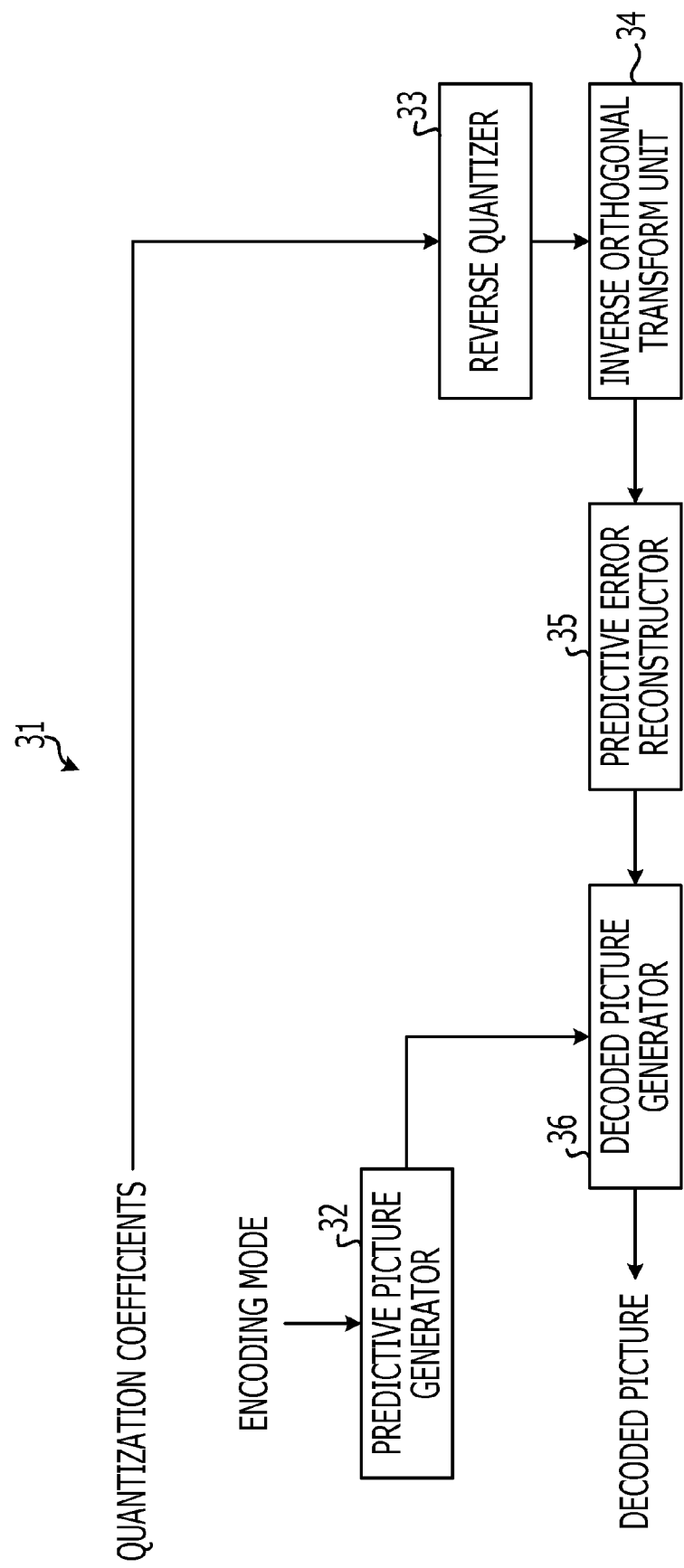
FIG. 4 is a block diagram illustrating an image processing apparatus in accordance with a second embodiment.

FIG. 4 is a block diagram illustrating an image processing apparatus in accordance with the second embodiment. As illustrated in FIG. 4, a decoder (image processing apparatus) 31 is provided with a predictive picture generator 32, a reverse quantizer 33, an inverse orthogonal transform unit 34, a predictive error reconstructor 35, and a decoded picture generator 36.

The predictive picture generator 32 generates a predictive picture for a decoding target block. At this point, the predictive picture generator 32 generates a predictive picture based on an encoding mode and pixel values of pixels included in already-decoded blocks around the decoding target block. The encoding mode is included in encoded data, and may be obtained by decoding encoded data with a decoding unit not illustrated in the drawings, for example.

The reverse quantizer 33 generates reverse quantization coefficients by reverse quantizing quantization coefficients. Quantization coefficients are included in encoded data, and may be obtained by decoding encoded data with a decoding unit not illustrated in the drawings, for example. The inverse orthogonal transform unit 34 generates inverse orthogonal transform data by applying an inverse orthogonal transform to reverse quantization coefficients generated by the reverse quantizer 33.

The predictive error reconstructor 35 generates predictive error based on inverse orthogonal transform data generated by the inverse orthogonal transform unit 34. At this point, when a first multiplication described earlier is conducted in the weighting unit 4 of the encoder 1 in accordance with the first embodiment, the predictive error reconstructor 35 may divide by a fifth constant the pixel values of pixels used to generate a predictive picture for another decoding target block from among the plurality of pixels included in the inverse orthogonal transform data (first division).

The fifth constant is equivalent to the third constant in the first embodiment. Consequently, the fifth constant may be greater than 1. The fifth constant and the above first constant may have the same value. When a second multiplication described earlier is conducted in the weighting unit 4 of the encoder 1 in accordance with the first embodiment, the predictive error reconstructor 35 may divide by a sixth constant the pixel values of pixels not used to generate a predictive picture for another decoding target block from among the plurality of pixels included in the inverse orthogonal transform data (second division).

The sixth constant is equivalent to the fourth constant in the first embodiment. Consequently, the sixth constant may be less than 1. The sixth constant and the above second constant may have the same value. When both a first multiplication and a second multiplication described earlier are conducted in the weighting unit 4 of the encoder 1 in accordance with the first embodiment, both a first division and a second division may be conducted in the predictive error reconstructor 35.

The decoded picture generator 36 generates a decoded picture. At this point, the decoded picture generator 36 may generate a decoded picture by summing predictive error reconstructed by the predictive error reconstructor 35 and a predictive picture generated by the predictive picture generator 32.

Description of Image Processing Method

An image processing method in accordance with the second embodiment is a decoding method that generates a decoded picture by decoding encoded data. A flowchart of a decoding method in accordance with the second embodiment is similar to the flowchart illustrated in FIG. 2, minus the operations from operation S2 to operation S5. When an encoded data decoding process (image processing) is started, first the decoder 31 generates a predictive picture for the decoding target block using the predictive picture generator 32. Next, the decoder 31 generates reverse quantization coefficients by reverse quantizing quantization coefficients using the reverse quantizer 33. The quantization coefficients include error mixed in during quantization in an encoding method in accordance with the first embodiment. Next, the decoder 31 generates inverse orthogonal transform by applying an inverse orthogonal transform to the reverse quantization coefficients using the inverse orthogonal transform unit 34. Error included in the quantization coefficients is uniformly propagated in the inverse orthogonal transform data.

Next, the decoder 31 reconstructs predictive error by applying the reverse of a weighting process in an encoding method in accordance with the first embodiment to the inverse orthogonal transform data. As described in the first embodiment, error is reduced in pixels used to generate a predictive picture for another decoding target block from among the plurality of pixels included in the reconstructed predictive error. Next, the decoder 31 generates a decoded picture based on the reconstructed predictive error and the predictive picture for the decoding target block using the decoded picture generator 36. The series of decoding operations for a single decoding target block is then terminated. This series of decoding operations is conducted on all decoding target blocks.

According to the second embodiment, a decoded picture can be generated by decoding data that has been encoded by an encoder and an encoding method in accordance with the first embodiment.

Third Embodiment

The third embodiment is an application of an image processing apparatus (encoder) in accordance with the first embodiment to an H.264 encoder. In the H.264 standard, luma encoding using intra-prediction is performed with macroblock units have 16 pixels horizontally by 16 pixels vertically (intra-16×16 mode), block units having 8 pixels horizontally by 8 pixels vertically (intra-8×8 mode), or block units having 4 pixels horizontally by 4 pixels vertically (intra-4×4 mode). Chroma encoding using intra-prediction is performed with block units having 8 pixels horizontally by 8 pixels vertically. In the description hereinafter, it is assumed that encoding process for a single source frame starts at the upper-left and proceeds to the right, and additionally from top to bottom.

Description of Intra-4×4 Mode

Figure 5:
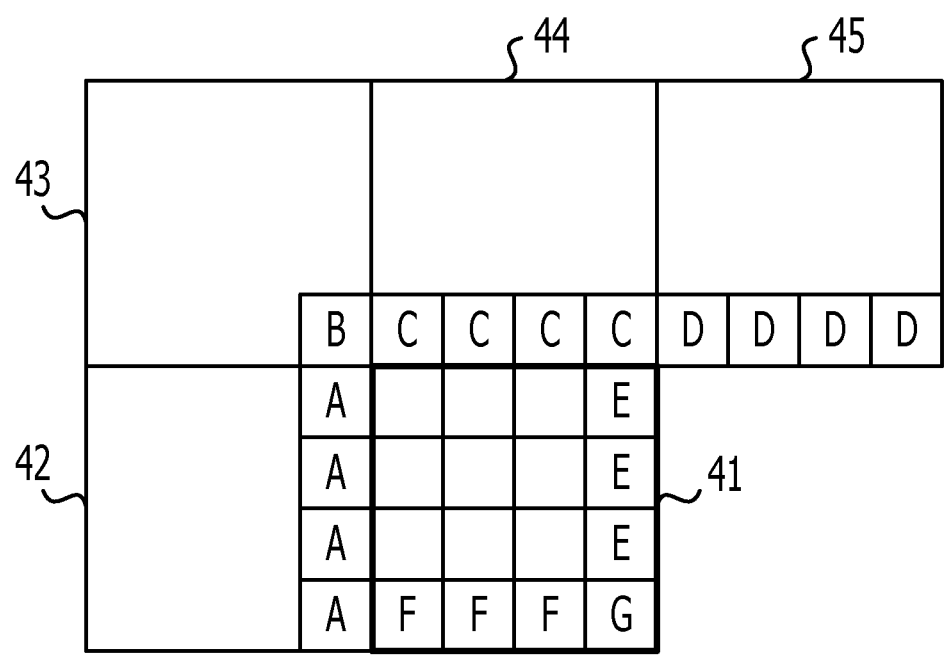
FIG. 5 is a diagram explaining an intra-4×4 mode.

FIG. 5 is a diagram explaining an intra-4×4 mode. As illustrated in FIG. 5, a predictive picture for an encoding target block 41 is generated on the basis of four pixels A along the right edge of the immediately left block 42, a pixel B in the lower-right corner of the diagonally upper-left block 43, pixels C lining the bottom edge of the directly above block 44, or pixels D lining the bottom edge of diagonally upper-right block 45. The immediately left block 42, the diagonally upper-left block 43, the directly above block 44, and the diagonally upper-right block 45 have already been encoded. The intra 4×4 mode includes eight modes for extrapolating pixel values of pixels (A, B, C, and D) at the above given positions in already-encoded blocks to predict pixel values in, for example, the vertical direction, the horizontal direction, or a diagonal direction, and a mode for taking the average value, for a total of nine prediction modes.

When generating a predictive picture for the block (not illustrated) immediately right of the encoding target block 41 after the encoding target block 41 is encoded, pixels E and G lining the right edge of the encoding target block 41 are used. When generating a predictive picture for the block (not illustrated) diagonally right and below the encoding target block 41, the pixel G in the lower-right corner of the encoding target block 41 is used. Also, when generating a predictive picture for the block (not illustrated) directly below or diagonally left and below the encoding target block 41, pixels F and G lining the bottom edge of the encoding target block 41 are used.

Description of Intra-8×8 Mode

Figure 6:
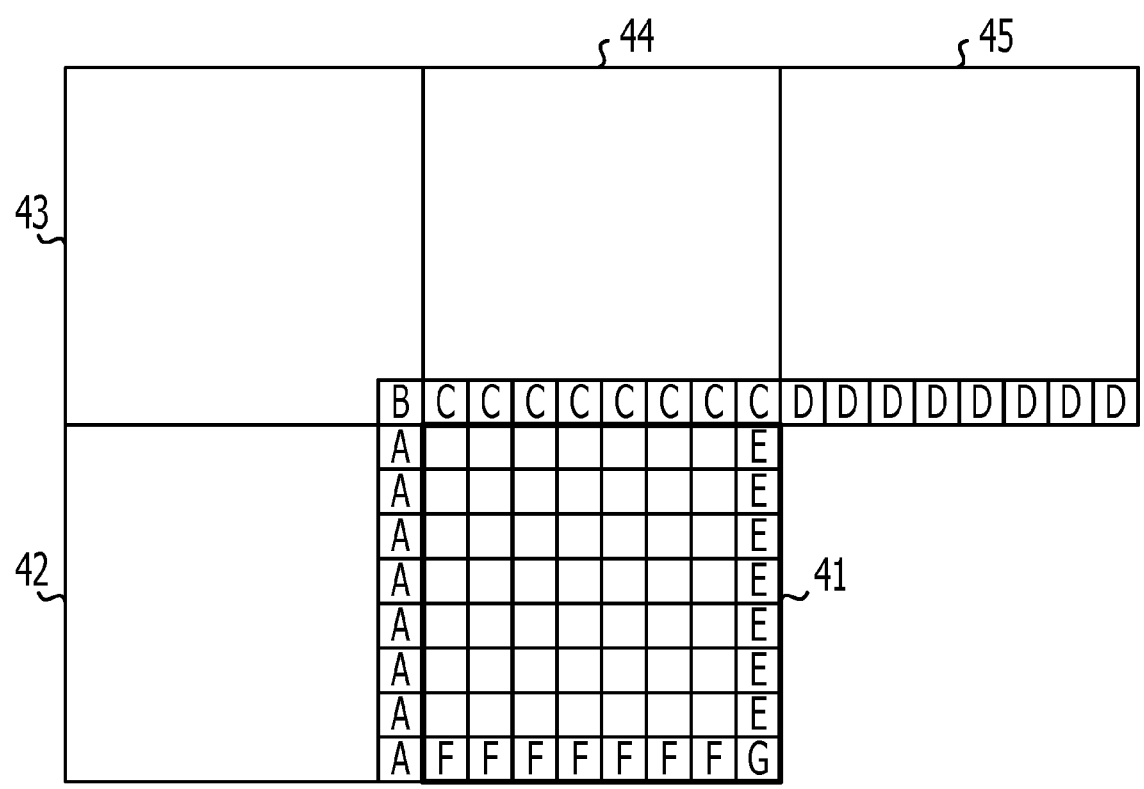
FIG. 6 is a diagram explaining an intra-8×8 mode.

FIG. 6 is a diagram explaining an intra-8×8 mode. As illustrated in FIG. 6, the intra-8×8 mode is similar to the intra-4×4 mode, except that the number of pixels in the horizontal direction and the vertical direction becomes 8 pixels.

Description of Intra-16×16 Mode

Figure 7:
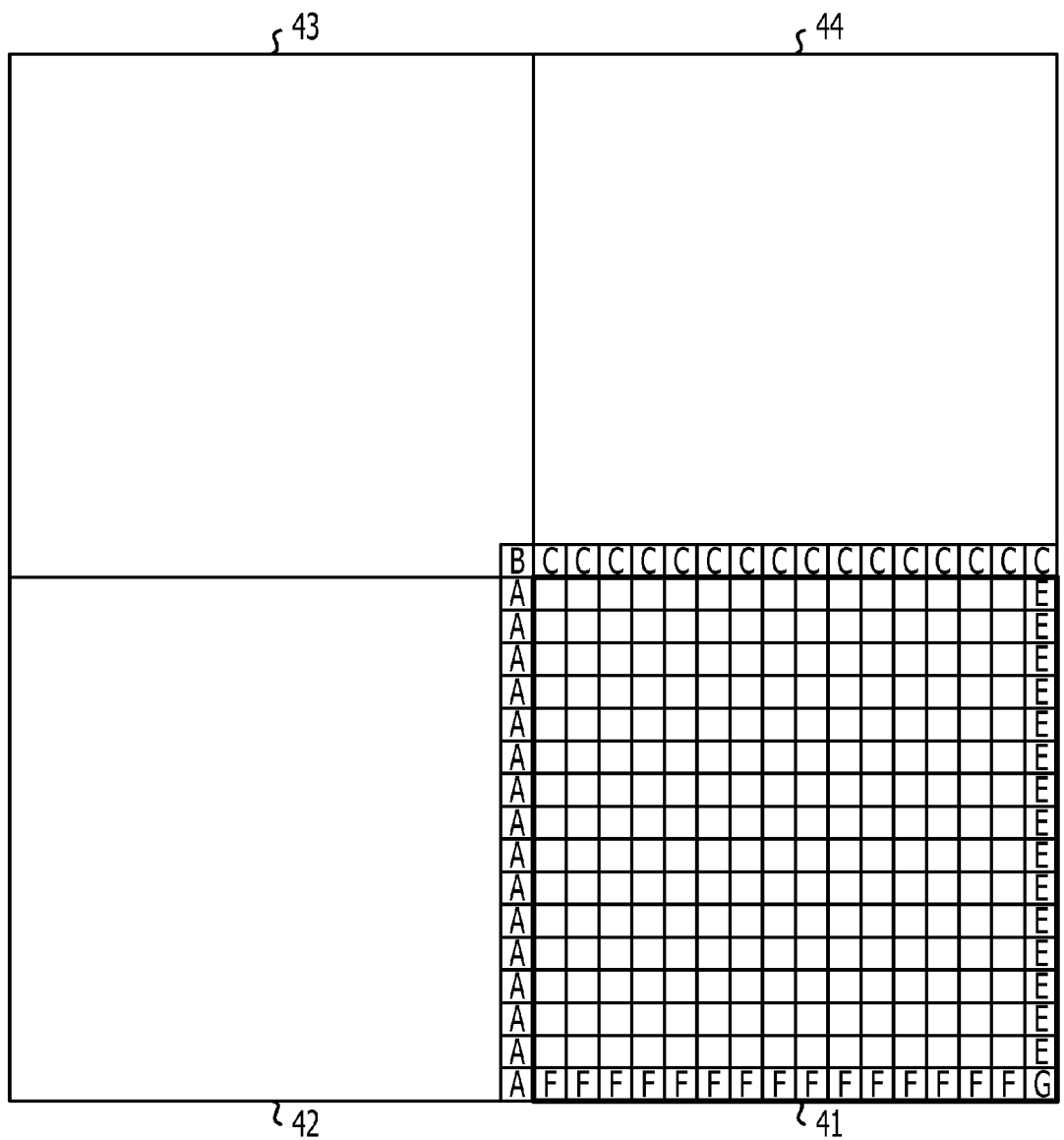
FIG. 7 is a diagram explaining an intra-16×16 mode.

FIG. 7 is a diagram explaining an intra-16×16 mode. As illustrated in FIG. 7, the intra-16×16 mode is similar to the intra-4×4 mode, except that the number of pixels in the horizontal direction and the vertical direction is 16 pixels, pixels lining the bottom edge of the block diagonally right and above the encoding target block 41 are not used, and the number of prediction modes is four modes.

Description of Chroma Intra Mode

Figure 8:
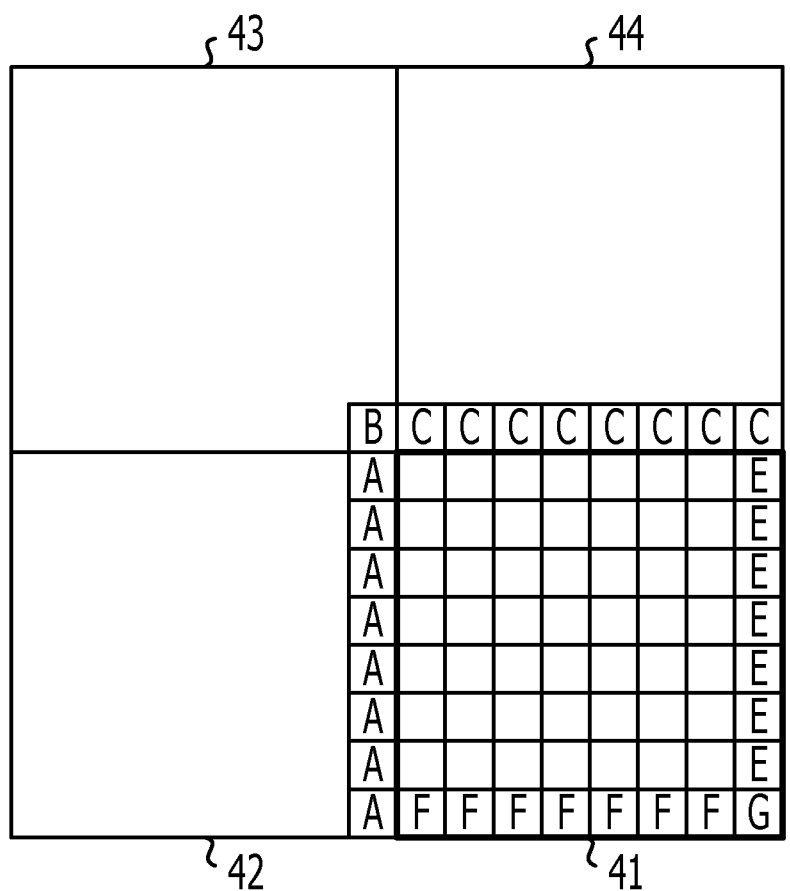
FIG. 8 is a diagram explaining a chroma intra mode.

FIG. 8 is a diagram explaining a chroma intra mode. As illustrated in FIG. 8, the chroma intra mode is similar to the intra-16×16 mode, except that the number of pixels in the horizontal direction and the vertical direction becomes 8 pixels.

Description of Image Processing Apparatus

Figure 9:
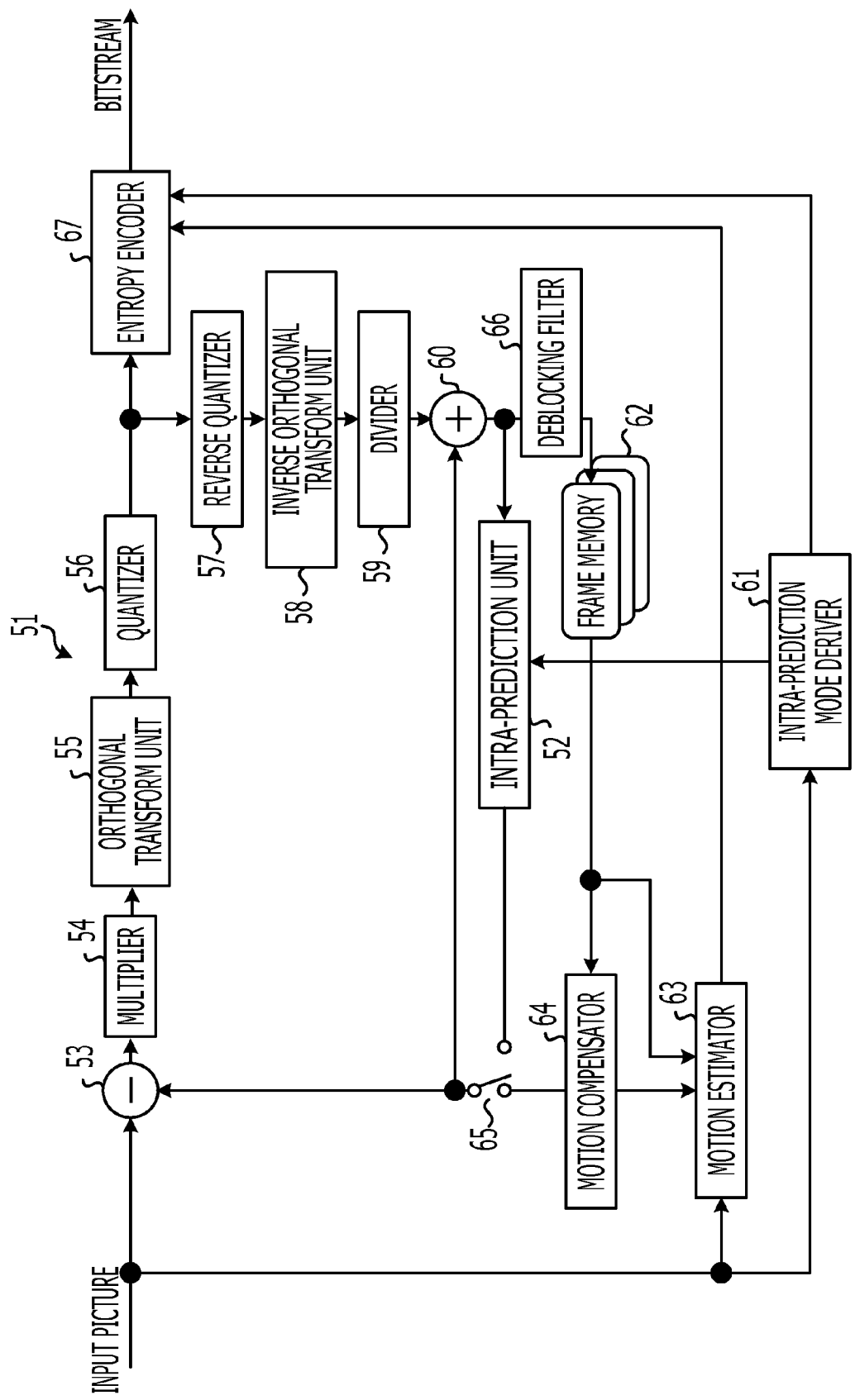
FIG. 9 is a block diagram illustrating an image processing apparatus in accordance with a third embodiment.

FIG. 9 is a block diagram illustrating an image processing apparatus (encoder) in accordance with the third embodiment. As illustrated in FIG. 9, an encoder 51 is provided with an intra-prediction unit 52 as a predictive picture generator, a subtractor 53 as a predictive error generator, a multiplier 54 as a weighting unit, an orthogonal transform unit 55, a quantizer 56, a reverse quantizer 57, an inverse orthogonal transform unit 58, a divider 59 as a predictive error reconstructor, and an adder 60 as a decoded picture generator. The encoder 51 is provided with an intra-prediction mode deriver 61, frame memory 62, a motion estimator 63, a motion compensator 64, a selector 65, a deblocking filter 66, and an entropy encoder 67.

The intra-prediction mode deriver 61 selects an optimal mode for an input picture from among intra-prediction modes. At this point, the intra-prediction mode deriver 61 selects a suitable mode for luma from among the four prediction modes of the intra-16×16 mode, the nine prediction modes of the intra-8×8 mode, or the nine prediction modes of the intra-4×4 mode. The intra-prediction mode deriver 61 selects a suitable mode for chroma from among four prediction modes. The intra-prediction unit 52 generates a predictive picture (intra-predictive picture) corresponding to the intra-prediction modes selected by the intra-prediction mode deriver 61.

The frame memory 62 accumulates past decoded pictures. The motion estimator 63 compares a past decoded picture accumulated in the frame memory 62 to an input picture, and detects similar picture regions therebetween. The motion estimator 63 computes the relative position of corresponding picture regions thus detected as a motion vector. The motion compensator 64 generates an inter-predictive picture based on a motion vector computed by the motion estimator 63 and a past decoded picture. Inter-predictive picture generation and intra-predictive picture generation may be conducted in parallel. The selector 65 selects either an intra-predictive picture or an inter-predictive picture for each block. At this point, the selector 65 compares the encoding efficiency for the case where an intra-predictive picture is selected to the coding efficiency for the case where an inter-predictive picture is selected, and selects the picture with the higher encoding efficiency as the final predictive picture.

The subtractor 53 takes the difference between a predictive picture selected by the selector 65 and an input picture as a predictive picture. The multiplier 54 multiplies by a constant greater than 1 the respective pixel values of pixels corresponding to the pixels E lining the right edge, the pixels F lining the bottom edge, and the pixel G at the lower-right corner illustrated in FIGS. 5 to 8 from among a plurality of pixels included in predictive error generated by the subtractor 53. The orthogonal transform unit 55 generates transform coefficients by applying an orthogonal transform to predictive error weighted by the multiplier 54. The quantizer 56 generates quantization coefficients by quantizing transform coefficients generated by the orthogonal transform unit 55. The reverse quantizer 57 generates reverse quantization coefficients by reverse quantizing quantization coefficients generated by the quantizer 56. The inverse orthogonal transform unit 58 generates inverse orthogonal transform data by applying an inverse orthogonal transform to reverse quantization coefficients generated by the reverse quantizer 57.

The divider 59 divides by a constant greater than 1 the respective pixel values of pixels corresponding to the pixels E lining the right edge, the pixels F lining the bottom edge, and the pixel G at the lower-right corner illustrated in FIGS. 5 to 8 from among a plurality of pixels included in inverse orthogonal transform data generated by the inverse orthogonal transform unit 58. The value of the constant in the divider 59 may be the same as the value of the constant in the multiplier 54. The adder 60 generates a decoded picture by adding predictive error constructed by the divider 59 to a predictive picture. A decoded picture generated by the adder 60 is used to generate an intra-predictive picture in the intra-prediction unit 52. The deblocking filter 66 smooths block boundaries in a decoded picture generated by the adder 60. Block noise is suppressed by the deblocking filter 66. A decoded picture with block boundaries smoothed by the deblocking filter 66 is stored in the frame memory 62.

The entropy encoder 67 generates a bit stream for quantization coefficients generated by the quantizer 56, an intra-prediction mode selected by the intra-prediction mode deriver 61, and a motion vector computed by the motion estimator 63. In an image processing method in accordance with the third embodiment, an encoding method related to intra-prediction is similar to the flowchart illustrated in FIG. 2 and the first embodiment, and thus further description thereof may be omitted or reduced.

The pixel G at the lower-right corner of the encoding target block 41 illustrated in FIGS. 5 to 8 is used when generating a predictive picture for the respective blocks immediately right, diagonally right and below, directly below, and diagonally left and below (not illustrated) the encoding target block 41. In contrast, the pixels E lining the right edge of the encoding target block 41 are used when generating a predictive picture for the block immediately right (not illustrated) of the encoding target block 41.

The pixels F lining the bottom edge of the encoding target block 41 are used when generating a predictive picture for the respective blocks directly below and diagonally left and below (not illustrated) the encoding target block 41. In other words, the frequency with which the pixel G at the lower-right is used when generating a predictive picture is higher than the frequency with which the pixels E lining the right edge and the pixels F lining the bottom edge are used. Thus, the value by which the pixel value of the pixel G is multiplied in the multiplier 54 and the value by which the pixel value of the pixel G at the lower-right corner is divided in the divider 59 may be made greater than the values for the pixels E lining the right edge and the pixel F lining the bottom edge. In this case, since the encoding error of a pixel with a high usage frequency can be reduced significantly more than that of other pixels, intra-prediction accuracy may be improved.

For example, 1.2 may be set as the value by which the respective pixel values of the pixels E lining the right edge and the pixels F lining the bottom edge are multiplied, and as the value by which the respective pixel values of the pixels E lining the right edge and the pixels F lining the bottom edge are divided, whereas 1.4 may be set as the value by which the pixel value of the pixel G at the lower-right corner is multiplied, and as the value by which the pixel value of the pixel G at the lower-right corner is divided. In addition, the value by which pixel values are multiplied and the value by which pixel values are divided may also be changed between the pixels E lining the right edge and the pixels F lining the bottom edge.

FIG. 10 is a diagram explaining the relationship between encoding target blocks and screen display positions. As illustrated in FIG. 10, when the display position of an encoding target block 41 is positioned at the lower-right corner of a screen 48, blocks to be displayed on the screen 48 do not exist to the right, to the lower-right, directly below, and to the lower-left of the encoding target block 41. Consequently, a block positioned at the lower-right corner of the screen 48 may not be used when generating a predictive picture for another block. In this way, an embodiment may be configured to not conduct multiplication in the multiplier 54 and division in the divider 59 for a block which is not used when generating a predictive picture for another block.

The case where the area to the right, lower-right, and directly below an encoding target block 41 are outside the screen 48, the case where the above area is outside the slice, and the case where the encoding is not in intra-prediction mode (inter-prediction mode, for example) may be given as examples where multiplication in the multiplier 54 and division in the divider 59 may be skipped due to a block not being used to generate a predictive picture for another block. In so doing, encoding efficiency can be improved.

The intra-4×4 mode and the intra-8×8 mode described earlier include a mode called average value mode that takes the average value of the pixels A, the pixel B, the pixels C, and the pixels D illustrated in FIGS. 5 and 6. In the average value mode of the intra-16×16 mode and the chroma intra mode, the average value of the pixels A, the pixel B, and the pixels C illustrated in FIGS. 7 and 8 is used. In this average value mode, a predictive picture may become a flat picture.

If multiplication and division described earlier is conducted on a flat picture in the multiplier 54 and the divider 59, the encoding error may decrease for pixels corresponding to the pixels E lining the right edge, the pixels F lining the bottom edge, and the pixel G at the lower-right corner illustrated in FIGS. 5 to 8, while the encoding error may increase for pixels corresponding to pixels other than the pixels E lining the right edge, the pixels F lining the bottom edge, and the pixel G at the lower-right corner illustrated in FIGS. 5 to 8 (i.e., non-lettered pixels). For this reason, visual degradation might be noticeable. Consequently, an embodiment may be configured to not conduct multiplication in the multiplier 54 and division in the divider 59 for the case of an average value mode.

Predictive error generated by the subtractor 53 may depend on the encoding target quantizer size. For example, the predictive error may be large given a large quantizer, and the predictive error may be small given a small quantizer. Consequently, a value by which pixel values are multiplied in the multiplier 54 and a value by which pixel values are divided in the divider 59 may be adaptively changed according to the quantizer size. For example, a value by which pixel values are multiplied in the multiplier 54 and a value by which pixel values are divided in the divider 59 may be increased when the quantizer is large, while a value by which pixel values are multiplied in the multiplier 54 and a value by which pixel values are divided in the divider 59 may approach 1 when the quantizer is small.

The multiplier 54 may also multiply by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels) from among a plurality of pixels included in predictive error. In this case, the divider 59 may divide by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels) from among a plurality of pixels included in inverse orthogonal transform data.

The multiplier 54 may also multiply by a constant greater than 1 the respective pixel values of pixels corresponding to the pixels E lining the right edge, the pixels F lining the bottom edge, and the pixel G at the lower-right corner illustrated in FIGS. 5 to 8, and multiply by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels). In this case, the divider 59 may divide by a constant greater than 1 the respective pixel values of pixels corresponding to the pixels E lining the right edge, the pixels F lining the bottom edge, and the pixel G at the lower-right corner illustrated in FIGS. 5 to 8, and divide by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels).

According to the third embodiment, advantages similar to those of the first embodiment are obtained.

Fourth Embodiment

The fourth embodiment is an application of an image processing apparatus (decoder) in accordance with the second embodiment to an H.264 decoder.

Description of Image Processing Apparatus

FIG. 11 is a block diagram illustrating an image processing apparatus (decoder) in accordance with a fourth embodiment. As illustrated in FIG. 11, a decoder 71 is provided with an intra-prediction unit 72 as a predictive picture generator, a reverse quantizer 73, an inverse orthogonal transform unit 74, a divider 75 as a predictive error reconstructor, and an adder 76 as a decoded picture generator. The decoder 71 is provided with an entropy decoder 77, frame memory 78, a motion compensator 79, a selector 80, and a deblocking filter 81.

The entropy decoder 77 decodes a bit stream encoded by an encoder 51 in accordance with the third embodiment, for example, and obtains quantization coefficients, motion vectors, and intra-prediction modes. The intra-prediction unit 72 generates an intra-predictive picture based on an intra-prediction mode decoded by the entropy decoder 77. The frame memory 78 accumulates past decoded pictures. The motion compensator 79 generates an inter-predictive picture based on a motion vector decoded by the entropy decoder 77 and a past decoded picture. Inter-predictive picture generation and intra-predictive picture generation may be conducted in parallel. The selector 80 selects either an intra-predictive picture or an inter-predictive picture for each block.

The reverse quantizer 73 generates reverse quantization coefficients by reverse quantizing quantization coefficients decoded by the entropy decoder 77. The inverse orthogonal transform unit 74 generates inverse orthogonal transform data by applying an inverse orthogonal transform to reverse quantization coefficients generated by the reverse quantizer 73. The divider 75 reconstructs predictive error by dividing by a constant greater than 1 the respective pixel values of pixels corresponding to the pixels E lining the right edge, the pixels F lining the bottom edge, and the pixel G at the lower-right corner illustrated in FIGS. 5 to 8 from among a plurality of pixels included in inverse orthogonal transform data generated by the inverse orthogonal transform unit 74. The value of the constant in the divider 75 may be the same as the value of the constant in the multiplier 54 of an encoder 51 in accordance with the third embodiment.

The adder 76 generates a decoded picture by adding predictive error reconstructed by the divider 75 to a predictive picture. A decoded picture generated by the adder 76 is used to generate an intra-predictive picture in the intra-prediction unit 72. The deblocking filter 81 smooths block boundaries in a decoded picture generated by the adder 76. Block noise is suppressed by the deblocking filter 81. A decoded picture with block boundaries smoothed by the deblocking filter 81 is stored in the frame memory 78. In addition, a decoded picture stored in the frame memory 78 is output to a display or other component not illustrated as a final decoded picture.

For example, in some cases the multiplier 54 of an encoder 51 in accordance with the third embodiment may multiply by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels). In this case, the divider 75 may divide by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels).

As another example, in some cases the multiplier 54 of an encoder 51 in accordance with the third embodiment may multiply by a constant greater than 1 the respective pixel values of pixels corresponding to the pixels E lining the right edge, the pixels F lining the bottom edge, and the pixel G at the lower-right corner illustrated in FIGS. 5 to 8, and multiply by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels). In this case, the divider 75 may divide by a constant greater than 1 the respective pixel values of pixels corresponding to the pixels E lining the right edge, the pixels F lining the bottom edge, and the pixel G at the lower-right corner illustrated in FIGS. 5 to 8, and divide by a constant less than 1 the respective pixel values of pixels corresponding to pixels other than the pixels E lining the right edge, the pixels F lining the bottom edge, and the pixel G at the lower-right corner illustrated in FIGS. 5 to 8 (i.e., non-lettered pixels). In an image processing method in accordance with the fourth embodiment, a decoding method related to intra-prediction is similar to the second embodiment, and thus further description thereof may be omitted or reduced.

According to the fourth embodiment, a decoded picture can be generated by decoding a bit stream that has been encoded by an encoder and an encoding method in accordance with the third embodiment.

It should be appreciated that embodiments discussed herein are not limited to the H.264 standard, and may be applied to a video coding standard that conducts intra-prediction by generating a predictive picture for an encoding target block based on pixel values of pixels included in already-encoded blocks.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image processing apparatus comprising:
a processor; and
a memory which stores a plurality of instructions, which when executed by the processor, cause the processor to execute;
generating a predictive picture for an encoding target block based on pixel values of pixels included in already-encoded blocks around the encoding target block;
generating predictive error based on a picture expressed by the encoding target block and the predictive picture;
applying weights to pixel values by conducting one or both of a first multiplication that multiplies by a first constant greater than 1 the pixel values of pixels used to generate a predictive picture for another encoding target block, and a second multiplication that multiplies by a second constant less than 1 the pixel values of pixels not used to generate the predictive picture for another encoding target block, the pixels being pixels from among a plurality of pixels included in the predictive error;
generating transform coefficients by applying an orthogonal transform to the predictive error;
generating quantization coefficients by quantizing the transform coefficients;
generating reverse quantization coefficients by reverse quantizing the quantization coefficients;
generating inverse orthogonal transform data by applying an inverse orthogonal transform to the reverse quantization coefficients;
reconstructing the predictive error by conducting one or both of a first division that divides by a third constant greater than 1 the pixel values of pixels used to generate the predictive picture for another encoding target block, and a second division that multiplies by a fourth constant less than 1 the pixel values of pixels not used to generate the predictive picture for another encoding target block, the pixels being pixels from among a plurality of pixels included in the inverse orthogonal transform data;
generating a decoded picture based on the reconstructed predictive error and the predictive picture; and
changing the value of the first constant for each pixel according to the usage frequency of pixels used to generate the predictive picture for another encoding target block from among a plurality of pixels included in the predictive error,
wherein a frequency with which pixels at the lower right of the encoding target block are used is higher than a frequency with which pixels lining a right edge or pixels lining a bottom edge are used.

2. The image processing apparatus according to claim 1, further comprising changing the value of the third constant for each pixel according to the usage frequency of pixels used to generate the predictive picture for another encoding target block from among a plurality of pixels included in the inverse orthogonal transform data.

3. The image processing apparatus according to claim 2, wherein the value of the first constant and the value of the third constant are proportional to a frequency of use of a pixel for generating the predictive picture for another encoding target block.

4. The image processing apparatus according to claim 3, wherein the first constant and the third constant have the same value for a pixel corresponding to a pixel included in the predictive error and a pixel included in the inverse orthogonal transform data.

5. The image processing apparatus according to claim 1, wherein the second constant and the fourth constant have the same value.

6. The image processing apparatus according to claim 1, wherein the first multiplication, the second multiplication, the first division, and the second division are not conducted in the case where none of the pixels included in the predictive error is used to generate the predictive picture for another encoding target block.

7. The image processing apparatus according to claim 1, wherein the size of the encoding target block and the already-encoded blocks is 4 pixels horizontally by 4 pixels vertically, 8 pixels horizontally by 8 pixels vertically, or 16 pixels horizontally by 16 pixels vertically.

8. An image processing apparatus comprising:
a processor; and
a memory which stores a plurality of instructions, which when executed by the processor, cause the processor to execute;
generating a predictive picture for a decoding target block based on pixel values of pixels included in already-decoded blocks around the decoding target block;
generating reverse quantization coefficients by reverse quantizing quantization coefficients included in encoded data;
generating generate inverse orthogonal transform data by applying an inverse orthogonal transform to the reverse quantization coefficients;
reconstructing predictive error from when the encoded data was generated by conducting one or both of a first division that divides by a fifth constant greater than 1 the pixel values of pixels used to generate a predictive picture for another decoding target block, and a second division that divides by a sixth constant less than 1 the pixel values of pixels not used to generate a predictive picture for another decoding target block, the pixels being pixels from among a plurality of pixels included in the inverse orthogonal transform data; and
generating a decoded picture based on the reconstructed predictive error and the predictive picture,
wherein a frequency with which pixels at the lower right of the decoding target block are used is higher than a frequency with which pixels lining a right edge or pixels lining a bottom edge are used.

9. An image processing method comprising:
generating a predictive picture for an encoding target block based on pixel values of pixels included in already-encoded blocks around the encoding target block;
generating predictive error based on a picture in the encoding target block and a predictive picture generated by the predictive picture generating operation;
applying weights to pixel values by conducting one or both of a first multiplication that multiplies by a first constant greater than 1 the pixel values of pixels used to generate a predictive picture for another encoding target block, and a second multiplication that multiplies by a second constant less than 1 the pixel values of pixels not used to generate a predictive picture for another encoding target block, the pixels being pixels from among a plurality of pixels included in predictive error generated by the predictive error generating operation;
generating transform coefficients by applying an orthogonal transform to predictive error that has been multiplied by the weighting operation;
generating quantization coefficients by quantizing transform coefficients generated by the orthogonal transform applying operation;
generating reverse quantization coefficients by reverse quantizing quantization coefficients generated by the quantizing operation;
generating inverse orthogonal transform data by applying an inverse orthogonal transform to reverse quantization coefficients generated by the reverse quantizing operation;
reconstructing predictive error by conducting one or both of a first division that divides by a third constant greater than 1 the pixel values of pixels used to generate a predictive picture for another encoding target block, and a second division that multiplies by a fourth constant less than 1 the pixel values of pixels not used to generate a predictive picture for another encoding target block, the pixels being pixels from among a plurality of pixels included in inverse orthogonal transform data generated by the inverse orthogonal transform applying operation; and
generating a decoded picture based on predictive error reconstructed by the predictive error reconstructing operation and a predictive picture generated by the predictive picture generating operation,
wherein, in the weighting operation, the value of the first constant is changed for each pixel according to the usage frequency of pixels used to generate a predictive picture for another encoding target block from among a plurality of pixels included in predictive error generated by the predictive error generating operation,
wherein a frequency with which pixels at the lower right of the encoding target block are used is higher than a frequency with which pixels lining a right edge or pixels lining a bottom edge are used.

10. The image processing method according to claim 9, wherein, in the predictive error reconstructing operation, the value of the third constant is changed for each pixel according to the usage frequency of pixels used to generate the predictive picture for another encoding target block from among a plurality of pixels included in the inverse orthogonal transform data.

11. The image processing method according to claim 10, wherein the value of the first constant and the value of the third constant are proportional to a frequency of use of a pixel for generating the predictive picture for another encoding target block.

12. The image processing method according to claim 11, wherein the first constant and the third constant have the same value for a pixel corresponding to a pixel included in the predictive error and a pixel included in the inverse orthogonal transform data.

13. The image processing method according to claim 9, wherein the second constant and the fourth constant have the same value.

14. The image processing method according to claim 9, wherein, in the weighting operation and the predictive error reconstructing operation, the first multiplication, the second multiplication, the first division, and the second division are not conducted in the case where none of the pixels included in the predictive error are used to generate the predictive picture for another encoding target block.

15. The image processing method according to claim 9, wherein the size of the encoding target block and the already-encoded blocks is 4 pixels horizontally by 4 pixels vertically, 8 pixels horizontally by 8 pixels vertically, or 16 pixels horizontally by 16 pixels vertically.

16. An image processing method comprising:
generating a predictive picture for a decoding target block based on pixel values of pixels included in already-decoded blocks around the decoding target block;
generating reverse quantization coefficients by reverse quantizing quantization coefficients included in encoded data;
generating inverse orthogonal transform data by applying an inverse orthogonal transform to reverse quantization coefficients generated by the reverse quantizing operation;
reconstructing predictive error from when the encoded data was generated by conducting one or both of a first division that divides by a fifth constant greater than 1 the pixel values of pixels used to generate a predictive picture for another decoding target block, and a second division that divides by a sixth constant less than 1 the pixel values of pixels not used to generate a predictive picture for another decoding target block, the pixels being pixels from among a plurality of pixels included in inverse orthogonal transform data generated by the inverse orthogonal transform applying operation; and
a decoded picture generator configured to generate a decoded picture based on predictive error reconstructed by the predictive error reconstructing operation and a predictive picture generated by the predictive picture generating operation,
wherein a frequency with which pixels at the lower right of the decoding target block are used is higher than a frequency with which pixels lining a right edge or pixels lining a bottom edge are used.

17. An image processing apparatus comprising:
a processor; and
a memory which stores a plurality of instructions, which when executed by the processor, cause the processor to execute;
generating a predictive picture for an encoding target block based on pixel values of pixels included in already-encoded blocks around the encoding target block;
generating predictive error based on a picture expressed by the encoding target block and the predictive picture; and
applying weights to pixel values by conducting a multiplication that multiplies by a constant greater than 1 the pixel values of pixels used to generate a predictive picture for another encoding target block, the pixels being pixels from among a plurality of pixels included in the predictive error,
wherein a frequency with which pixels at the lower right of the encoding target block are used is higher than a frequency with which pixels lining a right edge or pixels lining a bottom edge are used.

18. An image processing apparatus comprising:
a processor; and
a memory which stores a plurality of instructions, which when executed by the processor, cause the processor to execute;
generating a predictive picture for an encoding target block based on pixel values of pixels included in already-encoded blocks around the encoding target block;
generating predictive error based on a picture expressed by the encoding target block and the predictive picture; and
applying weights to pixel values by conducting a multiplication that multiplies by a constant less than 1 the pixel values of pixels not used to generate a predictive picture for another encoding target block, the pixels being pixels from among a plurality of pixels included in predictive error generated by the predictive error generator.

* * * * *